J. D. HAGAMAN.
Gate.

No. 200,716.　　　　Patented Feb. 26, 1878.

WITNESSES:
C. Neveux
C. Sedgwick

INVENTOR:
J. D. Hagaman
BY
ATTORNEYS.

UNITED STATES PATENT OFFICE.

JOSEPH D. HAGAMAN, OF WESTON, MICHIGAN.

IMPROVEMENT IN GATES.

Specification forming part of Letters Patent No. 200,716, dated February 26, 1878; application filed January 19, 1878.

*To all whom it may concern:*

Figure 1:
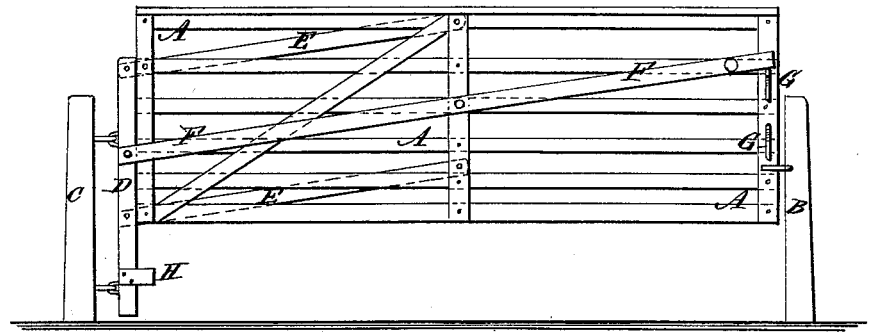
Figure 2:
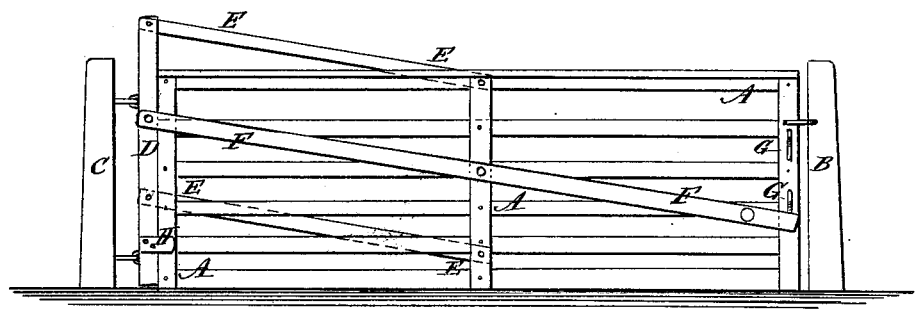
Figure 3:
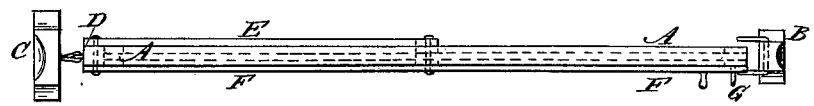

Be it known that I, JOSEPH DWIGHT HAGAMAN, of Weston, in the county of Lenawee and State of Michigan, have invented a new and useful Improvement in Gates, of which the following is a specification:

Figure 1 is a side view of my improved gate raised. Fig. 2 is a side view of the same lowered, and Fig. 3 a top view of the same.

The object of this invention is to furnish an improved gate which may be easily raised to swing over snow and ice, and to allow small stock to pass through, while preventing the passage of large stock, and which shall be so constructed that it will not sag, and at the same time shall be simple in construction and inexpensive in manufacture.

The invention consists in the combination of the hinged upright, the two parallel pivoted bars, and the pivoted lever with the rear post and the gate, as hereinafter fully described.

Similar letters of reference indicate corresponding parts.

A is the gate, which may be constructed in any desired style. B is the front or latch post, and C is the rear or hinge post. To the rear post C is hinged an upright, D, against the forward side of which the rear cross-bar of the gate A rests.

To the upper and middle parts of one side of the upright D are pivoted the rear ends of two parallel bars, E, the forward ends of which are pivoted to the middle cross-bar of the gate A. To the other side of the upright D, between the rear ends of the parallel bars E, is pivoted the rear end of the lever F. The lever F is pivoted to the middle cross-bar of the gate A, between the forward ends of the parallel bars E, and its forward end moves up and down along the side of the forward cross-bar of the said gate A.

By this construction, by operating the forward end of the lever F, the gate A may be raised and lowered, as may be required.

To the side of the front cross-bar of the gate A are attached catches G, to receive the forward end of the lever F, and thus lock the gate in any position into which it may be adjusted.

The forward end of the lever F may be provided with a handle, for convenience in operating it.

To the lower part of the side of the upright D, to which the rear end of the lever F is pivoted, is attached a short bar or block, H, to support the lower part of the gate, when lowered, against side pressure.

By this construction the gate A is supported from its center, so that it cannot sag, and the parallel bars E and the lever F cause it to move up and down vertically.

Having thus fully described my invention, I claim as new and desire to secure by Letters Patent—

The combination of the hinged upright D, the two parallel pivoted bars E, and the pivoted lever F with the rear post C and the gate A, substantially as herein shown and described.

JOSEPH DWIGHT HAGAMAN.

Witnesses:
 IRA J. HAGAMAN,
 DANIEL C. TUNISON.